(12) United States Patent
Henrichs et al.

(10) Patent No.: US 8,355,591 B2
(45) Date of Patent: Jan. 15, 2013

(54) LOSSLESS COMPRESSION PROCESS FOR INTERFEROGRAMS

(75) Inventors: Alois Henrichs, Friedrichshafen (DE); Stefan Weiss, Friedrichshafen (DE); Adrien Muller, Saint Cyr sur Loire (FR)

(73) Assignee: Astrium GmbH, Taufkirchen (DE)

( * ) Notice: Subject to any disclaimer, the term of this patent is extended or adjusted under 35 U.S.C. 154(b) by 824 days.

(21) Appl. No.: 12/306,473

(22) PCT Filed: Jun. 21, 2007

(86) PCT No.: PCT/DE2007/001095
§ 371 (c)(1),
(2), (4) Date: Aug. 14, 2009

(87) PCT Pub. No.: WO2008/000225
PCT Pub. Date: Jan. 3, 2008

(65) Prior Publication Data
US 2009/0310877 A1    Dec. 17, 2009

(30) Foreign Application Priority Data
Jun. 26, 2006  (DE) .................. 10 2006 029 539

(51) Int. Cl.
*G06K 9/46* (2006.01)
(52) U.S. Cl. ......... 382/244; 382/232; 382/245; 382/248
(58) Field of Classification Search .............. 382/232, 382/244, 245, 246, 247, 248, 250, 251; 341/59; 358/426.13
See application file for complete search history.

(56) References Cited

U.S. PATENT DOCUMENTS

| 5,225,980 | A  | * | 7/1993  | Hsieh et al. ............... 378/18 |
| 2001/0052977 | A1 |   | 12/2001 | Toyooka |
| 2004/0223651 | A1 | * | 11/2004 | Ottesen et al. ............ 382/232 |
| 2007/0133886 | A1 | * | 6/2007  | Berretty et al. ........... 382/232 |

FOREIGN PATENT DOCUMENTS
DE          43 03 178 A1     8/1993

OTHER PUBLICATIONS

European Office Action dated Feb. 23, 2010 (Five (5) pages).
German Office Action dated Jun. 17, 2008 (Five (5) pages).
Belfore, L. A. II, "An Adaptive Predictor for Efficient Lassless Coding of FTS Interferograms", Proceddings of the SPIE—The International Society for Optical Engineering, mathematice of Data, Image Coding, Compression, and Encryption V, with Applications, vol. 4793, 2003, pp. 168-175. XP-002455694.
Chaney, L. W., "Fundamentals of Fourier Transform Spectroscopy", Technical Report, ORA Project 05863, Department of Aerospace Engineering, High Altitude Engineering Laboratory, Feb. 1967, pp. 1-VIII and 1-46. XP-002455695.
Mailhes, C. et al., "Spectral Image Compression", Journal of Optics, vol. 21, No. 3, 1990, pp. 121-132. XP-020026911.
International Search Report dated Nov. 8, 2007 including English translation of the relevant portion (Seven (7) pages).
PCT/ISA/237 including English translation of the relevant portion (Fourteen (14) pages), Apr. 2005.

* cited by examiner

*Primary Examiner* — Ali Bayat
(74) *Attorney, Agent, or Firm* — Crowell & Moring LLP

(57) ABSTRACT

A process and apparatus for lossless data compression including the step of generating characteristic tables for predicted intensities as a function of radius values f(i,j)) on at least one type of preferred axes. Intensity signals of a detector matrix (I(i,j)) are used to implement the invention.

9 Claims, 11 Drawing Sheets

| r² Value of Each Pixel i,j = i²+j² | | | | | | | |
|---|---|---|---|---|---|---|---|
| | | | | | | | ↓ Row No. i |
| | 18 | 13 | 10 | 10 | 13 | 18 | 3 |
| | 13 | 8 | 5 | 5 | 8 | 13 | 2 |
| | 10 | 5 | 2 | 2 | 5 | 10 | 1 |
| | 10 | 5 | 2 | 2 | 5 | 10 | -1 |
| | 13 | 8 | 5 | 5 | 8 | 13 | -2 |
| | 18 | 13 | 10 | 10 | 13 | 18 | -3 |
| | -3 | -2 | -1 | 1 | 2 | 3 | ← Column No. j |

| Center axes | |
| --- | --- |
| r²(i,j)-value | Predicted intensity |
| 5 | =Average value from the intensities of the center axes pixels with r²(i,j)-Value 5 |
| 10 | =Average value from the intensities of the center axes pixels with r²(i,j)-Value 10 |
| ... | ... |
| i*i+1 | =Average value from the intensities of the center axes pixels with r²(i,j)-Value i*i+1 |
| ... | ... |
| 65537 | =Average value from the intensities of the center axes pixels with r²(i,j)-Value 256*256+1 |
| | |
| Diagonals | |
| r²(i,j)-value | Predicted intensity |
| 2 | =Average value from the intensities of the diagonal axis pixels with r²(i,j)-Value 2 |
| 8 | =Average value from the intensities of the diagonal axis pixels with r²(i,j)-Value 8 |
| 18 | =Average value from the intensities of the diagonal axis pixels with r²(i,j)-Value 18 |
| ... | ... |
| 2*i*i | =Average value from the intensities of the center axes pixels with r²(i,j)-Value i*i+j*j, for i²-j² |
| ... | ... |
| 131072 | =Average value from the intensities of the center axes pixels with r²(i,j)-Value 2*256*256 |

Fig. 5

| Predicted intensity determination on the example of a 12 x 12 detector matrix | |
|---|---|
| $r^2(i,j)$-value | Predicted intensity |
| 2 | =Average value from the intensities of the diagonal axis pixels with $r^2(i,j)$-Value 2 |
| 5 | =Average value from the intensities of the center axes pixels with $r^2(i,j)$-Value 5 |
| 8 | =Average value from the intensities of the diagonal axis pixels with $r^2(i,j)$-Value 8 |
| 10 | =Average value from the intensities of the center axes pixels with $r^2(i,j)$-Value 10 |
| 13 | =Interpolation from the predicted intensities of the pixels on the preferred axes which have a similar $r^2(i,j)$-Value |
| 17 | =Average value from the intensities of the center axes pixels with $r^2(i,j)$-Value 17 |
| 18 | =Average value from the intensities of the diagonal axis pixels with $r^2(i,j)$-Value 18 |
| 20 | =Interpolation from the predicted intensities of the pixels on the preferred axes which have a similar $r^2(i,j)$-Value |
| 25 | =Interpolation from the predicted intensities of the pixels on the preferred axes which have a similar $r^2(i,j)$-Value |
| 26 | =Average value from the intensities of the center axes pixels with $r^2(i,j)$-Value 26 |
| 29 | =Interpolation from the predicted intensities of the pixels on the preferred axes which have a similar $r^2(i,j)$-Value |
| 32 | =Average value from the intensities of the diagonal axis pixels with $r^2(i,j)$-Value 32 |
| 34 | =Interpolation from the predicted intensities of the pixels on the preferred axes which have a similar $r^2(i,j)$-Value |
| 37 | =Average value from the intensities of the center axes pixels with $r^2(i,j)$-Value 37 |
| 40 | =Interpolation from the predicted intensities of the pixels on the preferred axes which have a similar $r^2(i,j)$-Value |
| 41 | =Interpolation from the predicted intensities of the pixels on the preferred axes which have a similar $r^2(i,j)$-Value |
| 45 | =Interpolation from the predictive intensities of the pixels on the preferred axes which have a similar $r^2(i,j)$-Value |
| 50 | =Average value from the intensities of the diagonal axis pixels with $r^2(i,j)$-Value 50 |
| 52 | =Interpolation from the predicted intensities of the pixels on the preferred axes which have a similar $r^2(i,j)$-Value |
| 61 | =Interpolation from the predicted intensities of the pixels on the preferred axes which have a similar $r^2(i,j)$-Value |
| 72 | =Average value from the intensities of the diagonal axis pixels with $r^2(i,j)$-Value 72 |

Fig. 6

| $r^2$ Value of Each Pixel i,j = i²+j² | | | | | | | | | | | | | |
|---|---|---|---|---|---|---|---|---|---|---|---|---|---|
| | | | | | | | | | | | | ↓ Row No. | i |
| | 72 | 61 | 52 | 45 | 40 | 37 | 37 | 40 | 45 | 52 | 61 | 72 | 6 |
| | 61 | 50 | 41 | 34 | 29 | 26 | 26 | 29 | 34 | 41 | 50 | 61 | 5 |
| | 52 | 41 | 32 | 25 | 20 | 17 | 17 | 20 | 25 | 32 | 41 | 52 | 4 |
| | 45 | 34 | 25 | 18 | 13 | 10 | 10 | 13 | 18 | 25 | 34 | 45 | 3 |
| | 40 | 29 | 20 | 13 | 8 | 5 | 5 | 8 | 13 | 20 | 29 | 40 | 2 |
| | 37 | 26 | 17 | 10 | 5 | 2 | 2 | 5 | 10 | 17 | 26 | 37 | 1 |
| | 37 | 26 | 17 | 10 | 5 | 2 | 2 | 5 | 10 | 17 | 26 | 37 | -1 |
| | 40 | 29 | 20 | 13 | 8 | 5 | 5 | 8 | 13 | 20 | 29 | 40 | -2 |
| | 45 | 34 | 25 | 18 | 13 | 10 | 10 | 13 | 18 | 25 | 34 | 45 | -3 |
| | 52 | 41 | 32 | 25 | 20 | 17 | 17 | 20 | 25 | 32 | 41 | 52 | -4 |
| | 61 | 50 | 41 | 34 | 29 | 26 | 26 | 29 | 34 | 41 | 50 | 61 | -5 |
| | 72 | 61 | 52 | 45 | 40 | 37 | 37 | 40 | 45 | 52 | 61 | 72 | -6 |
| | -6 | -5 | -4 | -3 | -2 | -1 | 1 | 2 | 3 | 4 | 5 | 6 | | ← Column No. j |

LOSSLESS COMPRESSION PROCESS FOR INTERFEROGRAMS

This application is a continuation of PCT International Application No. PCT/DE2007/001095, filed Jun. 21, 2007, which claims priority under 35 U.S.C. §119 to German Patent Application No. 10 2006 029 539.0, filed Jun. 26, 2006, the entire disclosure of which is herein expressly incorporated by reference.

BACKGROUND AND SUMMARY OF THE INVENTION

The invention relates to a process for the compression of data in interferogram images, particularly for imaging Fourier transform spectrometers (FTS) of the Michelson interferometer type (for example, satellite-supported optical sensors for analyzing the earth atmosphere).

Fourier transform spectrometers, which are known from the state of the art, are passive instruments that are used for the spectral analysis of gases, liquids or solids. The satellite-supported Fourier transform spectrometers that are currently in use cannot yet supply any spatial information that is simultaneously generated at the detector (for example, MIPAS on the ENVISAT satellite, IMG on the ADEOS satellite).

One object of the present invention, therefore, is to provide a lossless compression process for interferograms.

This and other objects and advantages are achieved by the method and apparatus according to the invention, which includes the step of generating characteristic tables for predicted intensities as a function of radius values $f(i,j)$) on at least one type of preferred axes. Intensity signals of a detector matrix ($I(i,j)$) are used to implement the invention.

BRIEF DESCRIPTION OF THE DRAWINGS

FIG. 3 is an example of the assignment $(i,j) \rightarrow i2+j2$ for each pixel;

FIG. 4 shows the designation of the beams;

FIG. 5 shows characteristic tables for center axes (top) and diagonals (bottom) for a detector matrix example of 512×512 pixels;

FIG. 6 is an example of the determination of the predicted intensity for all 12×12 pixels of the detector matrix;

FIG. 7 is an example of a 12×12 detector matrix for establishing the reference image;

FIG. 8 shows preferred beams in the case of a rectangular detector with n×m (here in the example: 8×6) pixels;

DETAILED DESCRIPTION OF THE DRAWINGS

In order to understand the process according to the invention, (i.e., the novel compression of the image data), the characteristics of the interferogram image to be compressed will be explained first.

Figure 1:
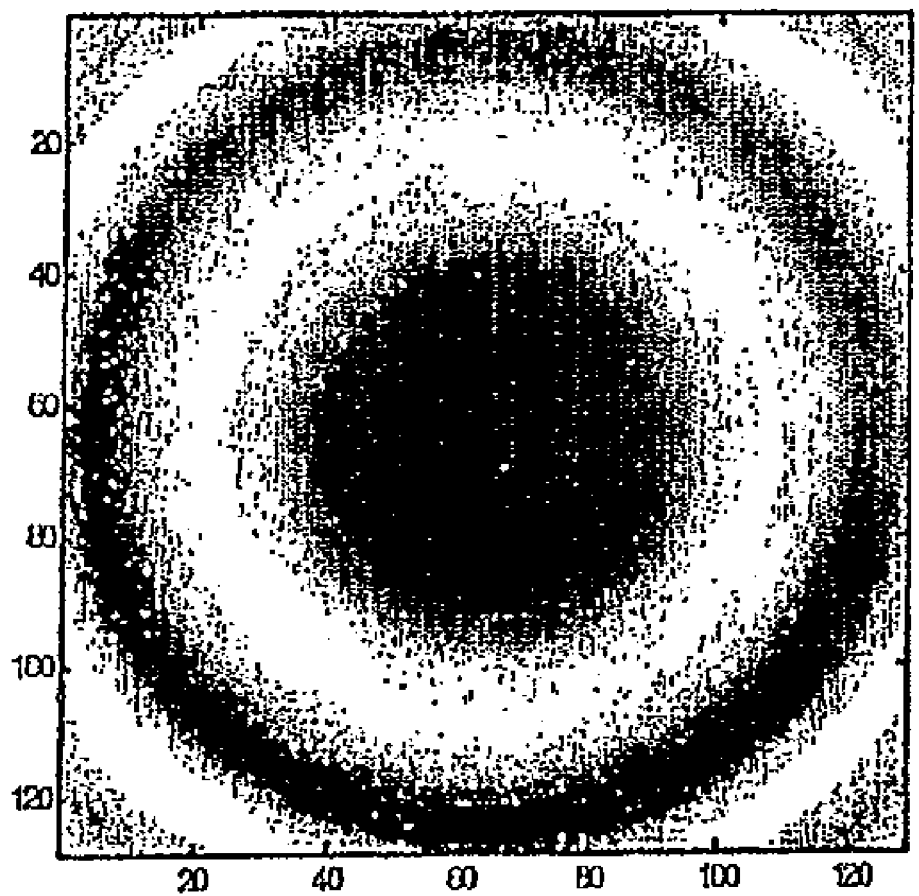
FIG. 1 is an example of the ring pattern in the image plane of an imaging Michelson interferometer for a fixed mirror position.

The interferogram image has a concentric circular structure, which is illustrated in FIG. 1. The suggested compression method utilizes this interference ring characteristic. The creation of interferogram images will be explained in the following.

As an example, the following description takes place by means of optical light waves; that is, electromagnetic radiation in the ultraviolet, visible or infrared spectral range. However, interference can be generated not only by means of light but by means of any type of waves, as long as the coherence length of the source is sufficient. This means that the coherence length has to be greater than the maximum selected path difference which is set between the two partial beams of the same wave train.

A scene to be observed is collimated at the instrument input by way of a lens system. Afocal telescopes are typical but there are also other methods. The result is an interferometer which divides the collimated light beam, introduces an optical path difference (opd) between the two partial beams, and then again superposes (thus recombines) the two partial beams. Subsequently, the recombined beam is imaged on an image plane by way of an imaging lens system. (See FIG. 9.)

A surface detector (detector matrix) situated in the image plane detects the intensity of the recombined light and resolves it both temporally (by a repeated time-related scanning) and spatially (by means of a detector matrix with n×m pixel elements). Angular information in the object space corresponds to spatial information in the image plane.

Figure 9:
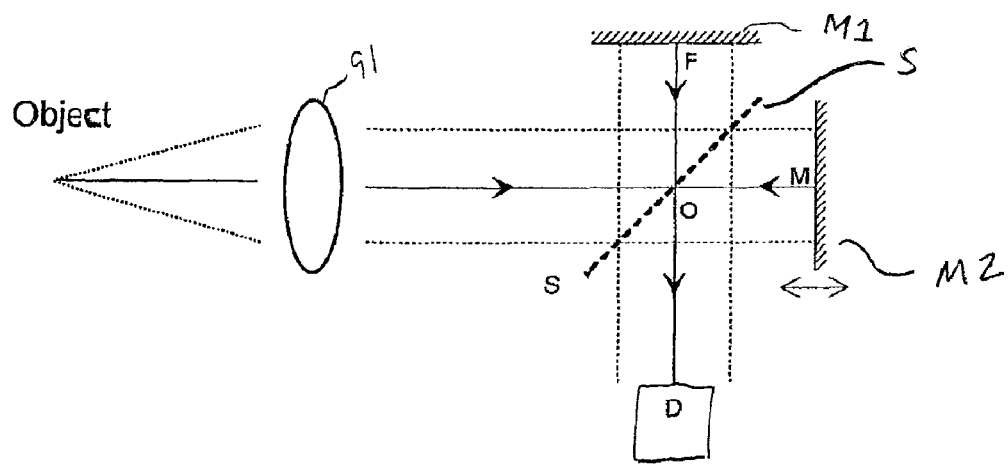
FIG. 9 is a schematic diagram of a Michelson interferometer arrangement.

A beam splitter divides the electromagnetic signal into a transmitted and into a reflected beam. Both beams pass separately through a certain wavelength before they are superposed again by way of a beam combining device. FIG. 9 shows a known compact Michelson interferometer arrangement. In such an arrangement, the beam combining device (S) is the same element as the beam splitter (S). Two deflection mirrors (M1, M2) separate the beams at the beam splitter (S), and send them back in the direction of the beam combining device (S).

Figure 10A:
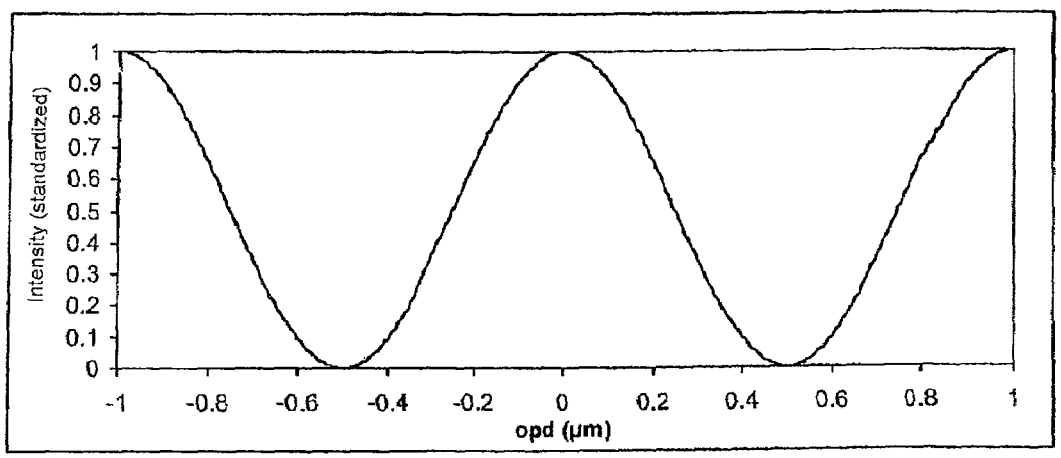
FIGS. 10a and 10b illustrate interferograms for monochromatic radiation; with $\lambda=1$ µm, and $\lambda=0.1$ µm, respectively.
Figure 10B:
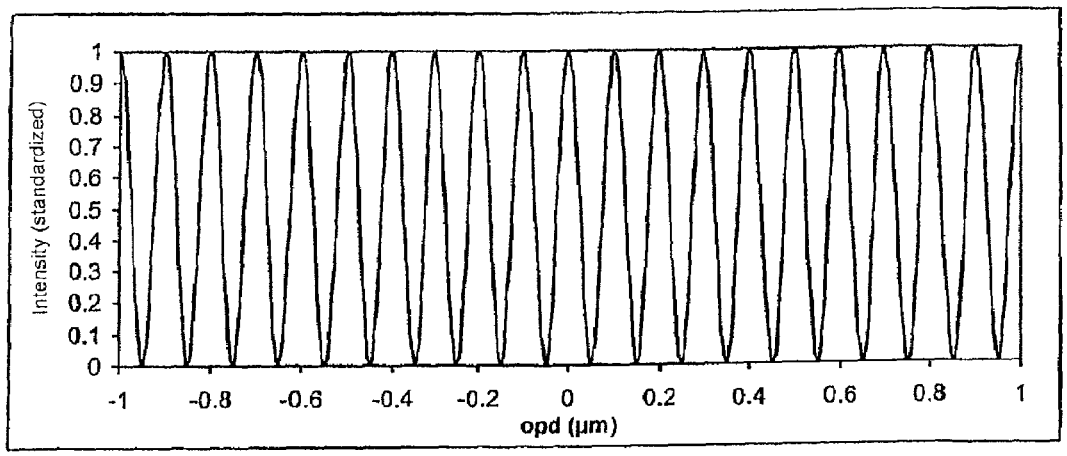

When the optical path length of the two separately extending beam sections is exactly the same, a constructive interference is created at the beam recombination. When an optical path length difference (opd) of the two partial beams is changed, for example, by moving one of the deflection mirrors (here M2), the intensity signal will vary (ideal 50:50 beam splitting assumed) between maximal interference and complete extinction. Extinction occurs in each case at a path length difference (opd) from an uneven-numbered multiple of half the wavelength of the light to be investigated. Maximal interference occurs at a path length difference which is an integral multiple of the wavelength. This is illustrated by the example of two wavelengths $\lambda$, specifically $\lambda=1$ µm and $\lambda=0.1$ µm, in FIG. 10.

For a light mixture of different wavelengths, the linear superposition of the interferograms of the individual wavelengths occurs in the interferogram.

Figure 11:
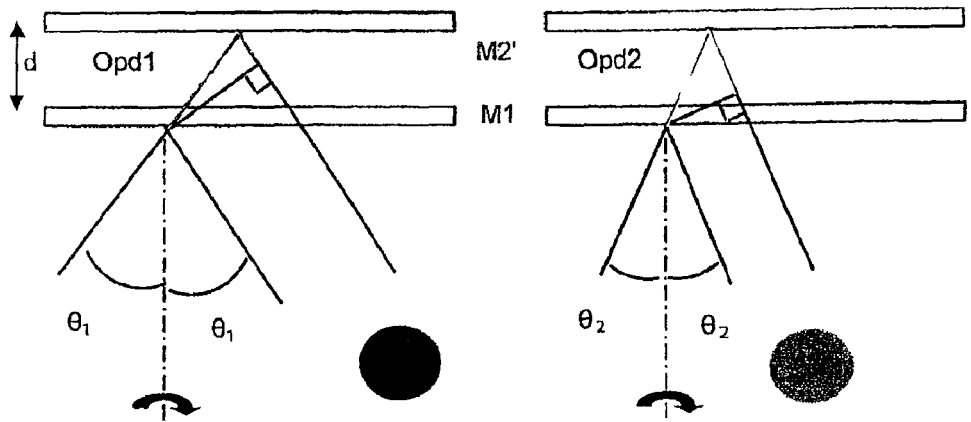
FIG. 11 is a schematic diagram of a beam incident in an inclined manner with respect to the optical axis.

So far, incident light has been considered that extends parallel to the optical axis. In the case of imaging Michelson interferometers, object points are transformed by the collimation lens system 91 (FIG. 9) into collimated beams which, in the interferometer, extend inclined at an angle of inclination ($\theta$) with respect to the optical axis. FIG. 11 is a schematic view of the beam geometry and the path length difference (opd) between the two partial beams. In this case, a second movable mirror (M2') is the equivalent image of the first movable mirror (M2) (FIG. 9) so that, in this schematic representation, the second movable mirror (M2') and the mirror (M1) have parallel mirror surfaces. The left side of FIG. 11 shows that a first angle of inclination ($\theta_1$) generates a first path length difference (opd1) at a given mirror distance (d). As shown on the right, a second angle of inclination ($\theta_2$) generates a second path length difference (opd2) different from the first path length difference (opd1) at the same mirror distance (d). The intensity of the superposed recombined beam again is a function of the path length difference (opd), and therefore varies with the angle of inclination ($\theta$). The originally different angles of inclination ($\theta$) of the collimated beam are detected after the imaging with a focal length (f) in the image plane as sites of a different distance (r) from the image center. Here, the image center is the point of intersection of the optical axis and the image plane.

The angle of inclination dependence of the intensity is rotationally symmetrical with respect to the optical axis and, after imaging of the collimated recombined beam onto an image plane, generates a ring pattern centered around the optical axis. (See FIG. 1.) When a matrix detector with n×n pixel elements (pixel size a×a) is mounted in this image plane, the ring pattern can be detected and read out pixel by pixel as a two-dimensional site-resolved image of the scene by means of the matrix detector.

When the mirror position d=0, the path length difference (opd) is zero for all inclination angles $\theta$. This mirror position corresponds to zero path difference (zpd) and maximal intensity exists for the entire image plane. However, when the movable mirror M2 (FIG. 11) is moved away from the center position d=0, the mirror position (d) and the path length difference (opd) will change correspondingly. As a result, the ring pattern in the image plane changes in that, originating from the center, new rings will appear and move toward the outside. The number of rings grows as the mirror position (d) increases.

The contrast of the ring pattern also depends on the mirror position (d) and on the spectrum to be observed.

During the movement of the movable mirror M2 and resultant variation of the mirror position d, the two-dimensional interferogram image will change in the image plane. The surface detector scans the interferogram image at regular time intervals, and is read out.

A two-dimensional interferogram image is therefore available for each scanning period. Each of these images is then processed using the compression process according to the invention. As a result of the large number of pixels and the high image taking rates during the mirror movement, after digitizing of the detector matrix signal, high data rates will occur. In future applications, without a significantly improved compression technique, the data rate may exceed the transmission capacity and will require an unnecessarily high storage capacity.

In typical instrument demands, the interferogram in the image plane of the detector matrix shows a characteristic concentric ring pattern, which varies with the optical path difference of the interferometer as well as with the wave number. This ring pattern is utilized in the compression process according to the invention, to produce a reference image (predicted or precalculated image).

The reference image is completely determined by a few characteristic data. These characteristic data merely require a minimum of data volume. In the compression then, the difference between the actual image and the reference image is coded, which results in a considerable reduction of the data quantity (in the digitized signal). Such differences occur, for example, due to the variation of the spectral composition of the observation scene in the viewing direction, by diverse imperfections present in the sensor, such as detector noise or uncalibrated changes in the pixel-to-pixel null balance value (dark signal non-uniformity) and in the pixel-to-pixel gain (photo response non-uniformity). The data transmission will then contain these characteristic data of the reference image and the compressed difference image. After the transmission, as a result of the lossless compression, a faithful reconstruction of the original interferogram becomes possible again.

Figure 2:
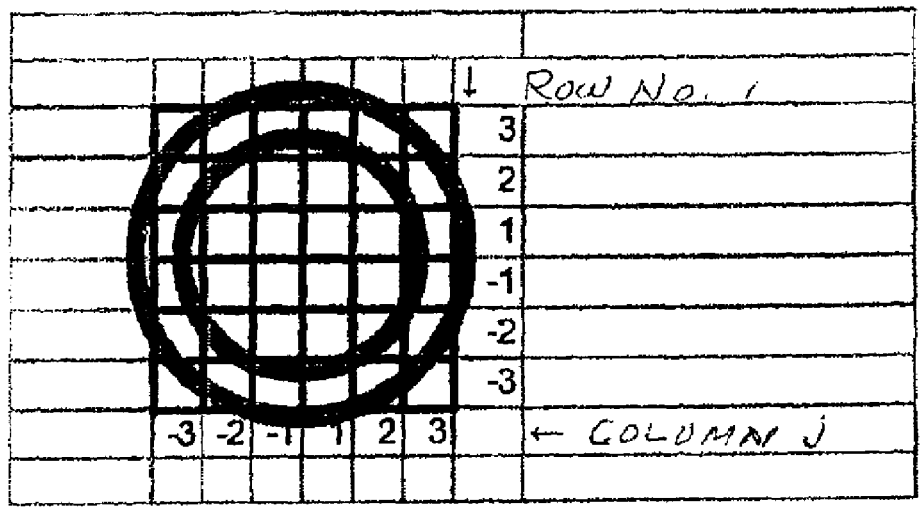
FIG. 2 is a view of the row and column index definition of the surface detector.

The numbering of pixels of the two-dimensional surface detector is as follows: It is assumed that the origin of the coordinates is situated in the center of the detector, so that it is between the four pixels located in an imaginary 2×2 pixel quartet. When the row or column number is uneven, correspondingly the one surplus line or column at the margin is not taken into account. Starting from the detector center, the pixels are now provided with a row index i and a column index j, as illustrated as an example in a 6×6 pixel detector in FIG. 2. Values i=0 and j=0 do not exist.

Each pixel is unambiguously determined by the index pair (i,j) in its position within the matrix. In order to utilize the rotational symmetry, a radius value is assigned to each pixel in order to define a measurement for the distance of the pixel from the origin of coordinates. For the compression, the radius values of a few pixels (which are situated on preferred beams) are used as supporting points for interpolation of the radius values of the other pixels. For the further description, the image rule $f(i,j)=r^2(i,j)=i^2+j^2$ may be selected as the radius value. However, this image rule is chosen only as example; other image rules are also conceivable and suitable for the process of the invention. For generating supporting points, it is important that, for pixels which are not situated on the preferred beams, an interpolation can be made that is as simple and precise as possible.

For example, the image rules $f(i,j)=r(i,j)=(i^2+j^2)^{\wedge(1/2)}$ or $f(i,j)=r^3(i,j)=(i^2+j^2)^{\wedge(3/2)}$ are suitable. Generally, any image rules can be used which utilize the concentric circular structure of the interferogram image.

FIG. 3 illustrates an example of the assignment by using the radius value $r^2(i,j)=i^2+j^2$. For the pixel with the position (i,j):=(2,−3), the radius value $2^2+(-3)^2=13$ will then be obtained. The central 2×2 element quartet has the following pixel indexes: (i,j)={(1,1), (1,−1), (−1,−1), (−1, 1)}.

Figure 4:
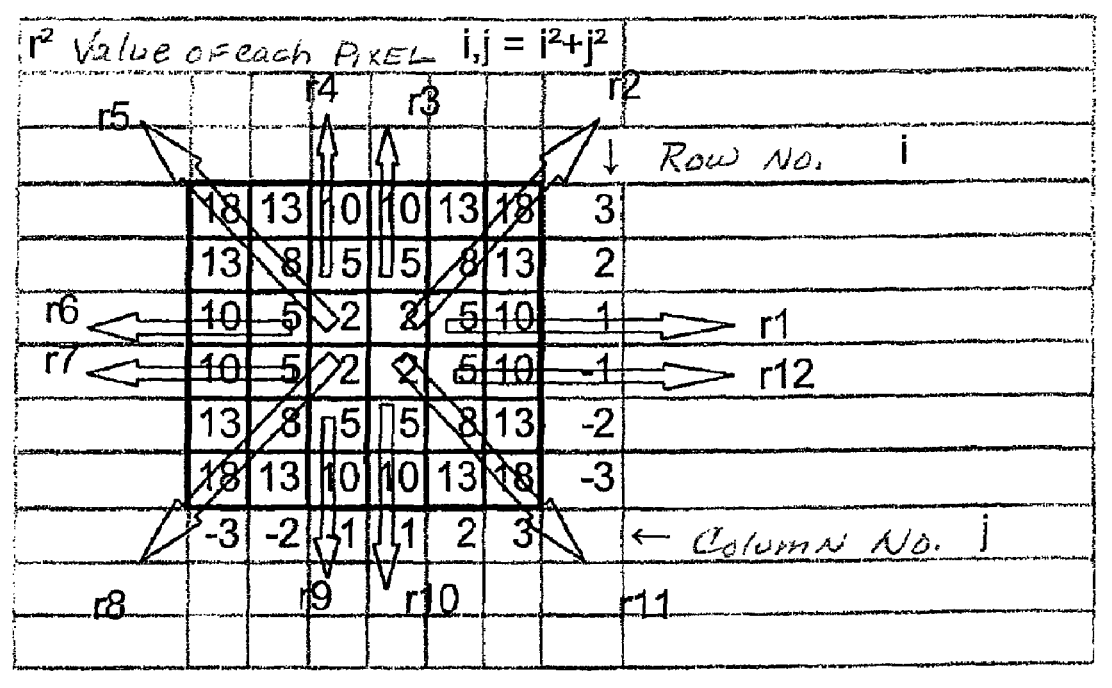

The beams, which extend from these four pixels to the outside, are preferred beams and are used for determining the supporting points for the complete reference image. In this case, preferred beams are the diagonal beams and the center axis beams. The diagonal beams start at the four pixels of the central 2×2 element quartet. The center axis beams in each case start one pixel farther on the outside. The nomenclature of the beams can be obtained from FIG. 4. In this case, the beams along the center axes (center axis beams) are: r1, r3, r4, r6, r7, r9, r10, r12. The beams along the four diagonals are (diagonal beams): r2, r5, r8, r11.

Next, the creation of the two characteristic tables for the reference image will be described.

For the center axis beams, the average value from the eight intensities actually detected in the pixels is assigned to each $r^2(i,j)$ value on the center axis (there are always eight center axis beam pixels with the same $r^2(i,j)$ value).

In principle, weighted average values can also be formed or other statistical moments can be used. As a result, individual regions in the interferogram image may be preferred; given a certain a priori knowledge of the interferogram image, this can make the compression still more effective, at the expense of additional processing expenditures.

For the diagonal beams, the average value from the four intensities actually detected in the pixels is assigned to each $r^2(i,j)$ value on the diagonal axis. (There are always four diagonal beam pixels with the same $r^2(i,j)$ value.) (See FIG. 5.)

Here also, as described above in the case of the center axes, other statistical operations can be used.

Now the reference image can be generated: A predicted intensity according to the characteristic table is assigned to each pixel that is situated on one of the preferred axes (i.e., diagonal beams or center axis beams). In other words, the assignment can be described as follows. It is assumed that $Q := \{r^2(i,j)|(i,j)$ from the preferred axis of the surface detector$\}$ is the quantity of the radius values from the preferred axes of the surface detector. For all radius values a from Q, the pixel indexes (i,j) are combined with the same radius values as follows:

$$M\alpha := \{(i,j) \text{ from the preferred axis of the surface detector} | r^2(i,j) = \alpha\}.$$

The characteristic tables (one table respectively for the diagonal axis and the center axis) are then provided by the image $$R(\alpha) := \frac{1}{card M_\alpha} \cdot \sum_{(i,j) \in M_\alpha} I(i,j)$$

for radius values $\alpha$ from Q, wherein I(i,j) is the actual detected intensity for the pixel index (i,j), and card $M_\alpha$ is the number of elements in quantity $M_\alpha$.

By means of these characteristic tables, the reference image R(i,j) is determined as follows by an assignment of the predicted intensities for each pixel index (i,j):

$$R(i,j) := R(\alpha), \text{ when } (i,j) \text{ is an element of } M_\alpha.$$

For large matrices, occasionally two identical $r^2(i,j)$ values (radius values) occur on the diagonal and center axes. In this case, the corresponding intensity from one axis type is assigned to both pixels.

For the remaining pixels of the detector (those which are not situated on the preferred axes), a predicted intensity is determined by interpolation from the reference image intensities of those pixels which are situated on the preferred axes:

$$R(i,j) := \text{Interpol}(R(\alpha)), \text{ when } (i,j) \text{ is not an element of } M_\alpha.$$

All interpolation methods are basically suitable for this purpose. An example of the process is described in FIG. 6. The detector matrix on which FIG. 6 is based is illustrated in FIG. 7. The reference image with reference intensities R(i,j) has now been completely generated for each pixel.

The difference image is created by a pixel-by-pixel difference formation of the actual intensities I(i,j) and the reference intensities R(i,j):

$$D(i,j) = I(i,j), \text{ for all } i,j.$$

The pixel values of the difference image (hence, the difference intensities) are coded by a compression algorithm, such as Huffman Coding. When a large number of interferogram images of different statistics are to be transmitted, a code table that is optimized with respect to these statistics can be used. The two characteristic tables are also coded in the same fashion.

The following elements are transmitted:
Coded difference image;
the two coded characteristic tables for predicted intensities as a function of the r2(i,j) values on the center axes and the diagonal axes; and
information (for example, index) for the currently used code table.

The above-mentioned two characteristic tables are: A table with value pairs ($r^2(i,j)$, intensity) for the pixels on the center axes and such a table for the pixels on the diagonal axes.

Huffman coding was mentioned as an example of a suitable compression technique. Other known entropy coding methods, such as variants of the Lempi-Ziv-Welsh method, or arithmetic coding methods, are also suitable and can be used. Tests have demonstrated that particularly the Huffman coding is suitable.

After the transmission, the following steps are carried out:
Decoding of the difference image using the Huffman Table;
reconstruction of the predicted image using the two characteristic tables and interpolation. In this case, the interpolation method should supply the same results as the one used in the sensor.
reconstruction of the original image I(i,j):

$$I(i,j) = R(i,j) + D(i,j), \text{ for all } i,j. \quad (3)$$

Figure 8:
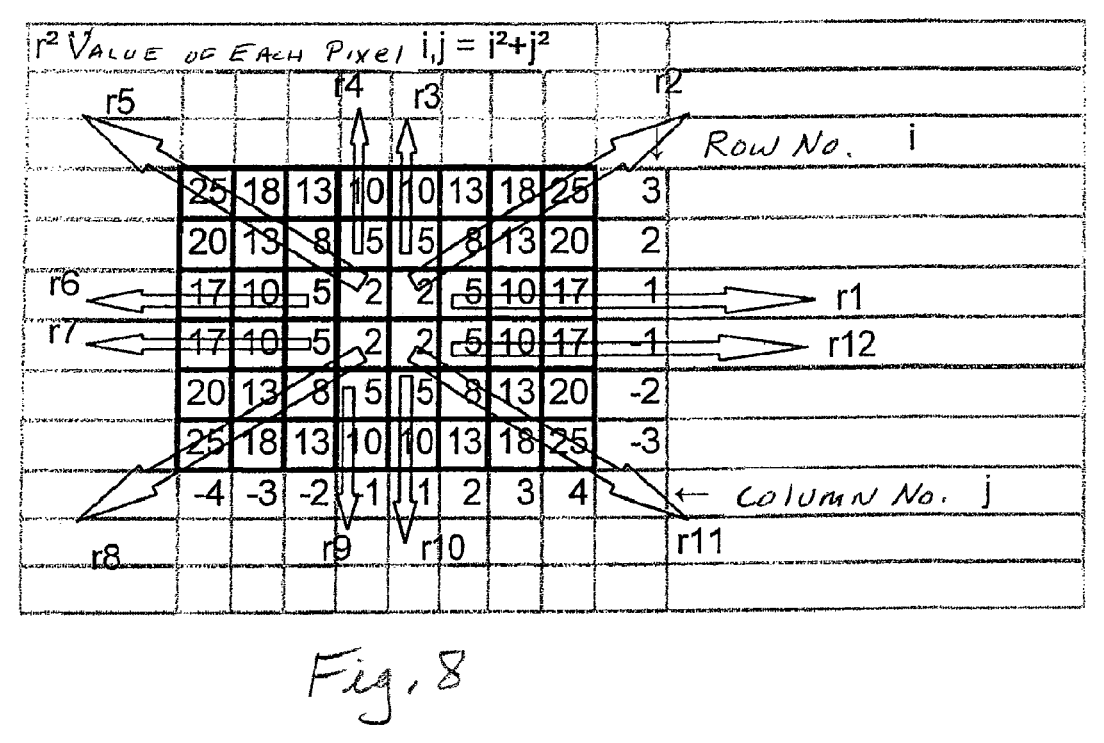

So far, the compression process has been described for square detector matrices with n×n pixels, with the square pixel pitch measurement a×a. In an expanded form, the compression process according to the invention is also applicable to detector matrices n×m, with uneven numbers of lines (n) and columns (m) and rectangular pixel measurements a×b. This will be described in the following as another embodiment of the process according to the invention. The then generally rectangular detector matrix with rectangular pixel pitch measurements now requires three characteristic tables for generating the reference image, in which case the following characteristic beams are used (FIG. 8):

The three characteristic tables are therefore obtained from the three preferred beam types as follows:

Along the line center axes r1, r6, r7, r12, along the column center axes r3, r4, r9, r10, along the diagonals r2, r5, r8, r11.

The characteristic table, which is generated from the diagonals, uses pixel (i,j) according to a special rule, for example, according to the nearest-neighbor method. In the example illustrated in FIG. 8, using, for example, the nearest-neighbor method, the following $r^2(i,j)$ values are contained in this table: 2 (=direct), 8(=nearest neighbor), 13(=nearest neighbor), 18 (=nearest neighbor), 25(=direct). After establishment of the characteristic tables, further steps are performed analogously to the methods described for square matrices.

Figure 12:
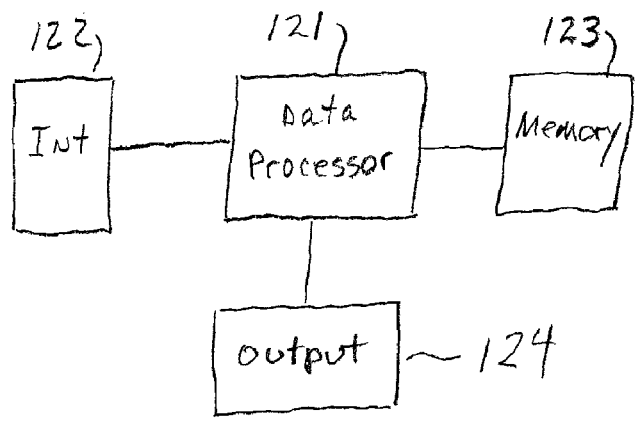
FIG. 12 illustrates an apparatus for carrying out the method according to the invention.

The invention also provides a device for implementation of the process according to the invention, which is illustrated in FIG. 12. It includes data processor 121 which is coupled to receive output signals from an interferometer 122, which may be, for example, the interferometer in either FIG. 9 or FIG. 11. The latter processes the signals using the techniques described previously, which are stored in the form of software, in a memory 123, and provides an output via an interface 124.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for the lossless data compression comprising:
generating, by a processor, characteristic tables for predicted intensities as a function of pixel radius values f(i,j) on at least one type of preferred axes; and
applying, by the processor, the characteristic tables to intensity signals of a detector matrix (I(i,j)), wherein said applying step includes generating a reference image (R(i,j)) using the characteristic tables.

2. The process according to claim 1, wherein said applying step further includes determining a difference image (D(i,j)), using the intensities of the detector matrix (I(i,j)) and of the reference image (R(i,j)).

3. The process according to claim 2, wherein said applying step further includes coding the difference image (D(i,j)) using a compression algorithm.

4. The process according to claim 3, further comprising transmitting the coded difference image (D(i,j)) and the characteristic tables.

5. The process according to claim 4, further comprising:
decoding the difference image (D(i,j));
reconstructing the reference image (R(i,j)) by means of the characteristic tables; and
reconstructing of intensities of the detector matrix (I(i,j)).

6. The process according to claim 1, wherein two types of preferred axes are used.

7. The process according to claim 6, wherein the first type of preferred axes comprise diagonal axes, and the second type of preferred axes comprise center axes.

8. The process according to claim 1, wherein intensities of the detector matrix (I(i,j)) are given by circular two-dimensional interference patterns of imaging Fourier transform spectrometers.

9. Apparatus for the lossless data compression, the apparatus comprising:
a processor configured to
generate characteristic tables for predicted intensities as a function of pixel radius values f(i,j) on at least one type of preferred axes; and
apply the characteristic tables to intensity signals of a detector matrix (I(i,j)), wherein the applying includes generating a reference image (R(i,j)) using the characteristic tables.

* * * * *